| United States Patent [19] | [11] Patent Number: 4,877,554 |
| Honma et al. | [45] Date of Patent: Oct. 31, 1989 |

[54] RESISTANCE PASTE

[75] Inventors: Kanehito Honma, Nagaokakyo; Tsutomu Yokoi, Suita; Hiroji Tani, Nagaokakyo, all of Japan

[73] Assignee: Murata Manufacturing Co., Ltd., Japan

[21] Appl. No.: 222,280

[22] Filed: Jul. 21, 1988

[30] Foreign Application Priority Data

Jul. 22, 1987 [JP] Japan .................................. 62-182995

[51] Int. Cl.$^4$ ............................................. H01B 1/06
[52] U.S. Cl. .................................... 252/511; 252/502; 252/506; 252/508; 252/509; 523/468; 523/457; 524/495; 524/496; 524/451
[58] Field of Search ............... 252/511, 502, 506, 508, 252/509; 524/495, 496, 451; 428/408, 403, 407; 427/220, 212; 423/460; 523/468, 457

[56] References Cited

U.S. PATENT DOCUMENTS

| 4,431,575 | 2/1984 | Fujie et al. | 252/502 |
| 4,439,491 | 3/1984 | Wilson | 252/502 |
| 4,528,213 | 7/1985 | Nelson et al. | 252/511 |
| 4,534,998 | 8/1985 | Du Pont et al. | 252/511 |
| 4,610,811 | 9/1986 | Yamamoto et al. | 252/511 |
| 4,650,360 | 3/1987 | Pitts et al. | 252/502 |
| 4,732,702 | 3/1988 | Yamazaki et al. | 252/511 |
| 4,774,137 | 9/1988 | Alberts et al. | 428/407 |

*Primary Examiner*—Josephine Barr
*Attorney, Agent, or Firm*—Ostrolenk, Faber, Gerb & Soffen

[57] ABSTRACT

Resistance paste comprises conductive powder suspended in a binder resin, and is characterized in that the conductive powder comprises graphite powder of which particles are coated or covered with at least one higher fatty acid having at least 12 carbon atoms. The paste may contain carbon black as a part of the conductive powder. The paste may further contain a filler, preferably, fine powder of talc having a mean particle diameter of not more than 5 $\mu$m.

14 Claims, No Drawings

RESISTANCE PASTE

FIELD OF THE INVENTION

This invention relates to a resistance paste and, more particularly, to a resistance paste containing carbon powder as a conductive powder.

BACKGROUND OF THE INVENTION

A resistance paste is generally applied to film-type resistors such as, for example, fixed resistors and semi-adjustable resitors. Basically such resistors consist of a conducting film or carbon deposited on an insulating substrate. The conducting film is generally produced by applying a resistance paste to an insulating disk or square plate of alumina or resin, and then heat-treating the coating in air at a suitable temperature. Thus, the electrical properties of the resistors depend on the physical properties of the components of the resistance paste.

The resistance paste of the art generally comprises a carbon powder such as carbon black and graphite suspended in a binder of a thermosetting resin. If the occasion demands, the paste further contains organic or inorganic fillers. However, the carbon powder and binder resin used have a large negative temperature coefficient of resistance so that the resistors produced have a large negative temeprature coefficient of resistance. In particular, the temperature coefficient of resistance shifts to the negative side with an increase of resistance value, or an increase of binder resin content in the conducting film of the resistor. In addition, the resistors possess a large change rate of resistance with temperature when used under severe operating conditions such as, for example, those of 60° C. and 95% humidity, or a high temperature atmosphere of 125° C. Accordingly, it is impossible to use these resistors in applications in which greater stability of resistance with temperature and humidity is demanded.

SUMMARY OF THE INVENTION

It is therefore an object of the present invention to provide a resistance paste which makes it possible to produce film type resistors having greater stability of resisance with temperature and humidity, and a positive temperature coefficient of resistance at high temperatures.

According to the present invention, the above object is achieved by use of a conductive powder comprising graphite powder coated or covered with higher fatty acid having at least 12 carbon atoms.

DETAILED DESCRIPTION OF THE INVENTION

According to the present invention, there is provided resistance paste comprising conductive powder suspended in a binder resin, characterized in that said conductive powder comprises a graphite powder whose particles are coated or covered with at least one higher fatty acid having at least 12 carbon atoms.

As te conductive powder, graphite powder coated or covered with a higher fatty acid may be used alone or in combination with any of the conventionally known carbon powders such as carbon black. It is, however, preferred that the graphite powder to be used has a particle diameter of not more 20 $\mu$m. When the graphite powder is used in combination with other carbon powder, it is preferred to use carbon black with a particle diameter of not more than several ten millimicrons. In this case, up to 98 % of graphite powder may be replaced with carbon black to adjust the resistance of the products.

As the fatty acid, there may be used any of the known higher fatty acids having at least 12 carbon atoms. It is, however, preferred to use saturated straight chain higher fatty acids with at least 12 carbon atoms. The straight chain higher fatty acids include, without being limited to, myristic acid, palmitic acid, pentadecylic acid, stearic acid, melissic acid and the like. These higher fatty acids may be used alone or in combination.

When preparing the conductive powder, the higher fatty acid is mixed with graphite powder in a predetermined weight ratio ranging from 3:10 to 0.1:10, so that the higher fatty acid adheres physically and/or chemically to graphite particles to form a very thin coating on the graphite particles.

The resistance paste of the present invention may further contain a filler, if occasion demands. In this case, it is preferred to use fine particles having a mean particle diameter of not more than 5 $\mu$m.

As the filler, there may be used any of the conventionally known inorganic and organic fillers. The inorganic fillers include, without being limited to, silica, talc and alumina. The organic fillers include, without being limited to fluorine resins. The filer is used in the form of very fine powder. Most preferred filler is talc with a mean particle diameter ranging from 1 to 5 $\mu$m, which is smaller than that of the conventionally used filler of which mean particle diameter ranges from 5 to 10 $\mu$m.

As the binder resin, there may be used any of the conventionally known thermosetting resins such as, for example, epoxy resins, melamine resins, phenol resins, xylene resins and the like. The binder resin is used in the form of a solution dissolved in an organic solvent such as, for example, terpineol, butyl ethylene glycol monomethyl ether, butyl diethylene glycol monomethyl ether acetate, benzyl alcohol, and the like. Any of the conventionally known organic solvents may be used for this purpose.

The resistance paste of the present invention may contain the above three components in any ratio according to demand. It is, however, preferred that the resistance paste has a composition consisting essentially of 5 to 70 wt % of conductive powder, 0 to 30 wt % of a filler, and 20 to 80 wt % of a binder resin, for the following reasons.

If the content of conductive powder is less than 5 wt %, the square resistance becomes too large and the temperature coefficient of resistance becomes large and exceeds ±1000 ppm/° C. If the content of conductive powder exceeds 70%, it is difficult to obtain a conducting film with a mechanical strength sufficient for practical use, and it causes lowering in the printing properties of the paste and the electrical properties of the conducting films at high humidity.

If the content of the binder resin is less than 20% by weight, the amount of conductive powder becomes too large thus making it impossible to produce a resistance paste with good printing property. If the content of binder resin exceeds 80% by weight, it causes running from printed patterns to be formed, resulting in the scattering of a value of the resistance.

The filler may be incorporated into the resistance paste in an amount of not more than 30% by weight to adjust the resistance of the resistors. If the content of the filler exceeds 30% by weight, the resistance to humidity becomes lowered and the electrical resistance of the conductive film becomes too large.

The resistance paste according to the present invention may be produced in the following manner: Graphite powder and higher fatty acid are weighed in a predetermined weight ratio, and then milled in a mill for a suitable period of time to prepare the conductive powder. The resultant conductive powder is mixed with a suitable amount of a binder resin to prepare resistance paste. If the occasion demands, a suitable amout of carbon black and/or a filler may be added to the binder resin together with the coated graphite powder. Further, the carbon black may be added to the graphtie powder before coating the latter with the higher fatty acid.

The resistance paste according to the present invention may be applied by screen printing to an insulating substate and then backed in air at a suitable temperature which does not causes decomposition of the binder resin and higher fatty acid adhered to carbon particles to produce film type resistors basically consisting of a conducting film deposited on the insulating substrate.

The thus produced resistors have greater stability of resistance with temperature and humidity and possess a positive temperature coefficient of resistance at a high temperature. It is believed that such excellent results are obtained by the combined use of the carbon powder coated with higher fatty acid and fine powder of the filler because such a combination enables one to produce a conductive film having a structure close to the closest packing, so that an increase or decrease of the conducting paths caused by shrinkage or expansion of binder resin is inhibited, resulting in a decrease of a change rate of resistance with temperature or humidity.

EXAMPLE 1

Using commercially available flaky graphite having a particle diameter ranging from 1 to 3 μm, carbon black having a particle diameter ranging from 15 to 40 millimicrons, of stearic acid powder (purity: 99.99%), talc having a mean particle diameter of 2.1 μm, and a 50% solution of phenolic resin dissolved in benzyl alcohol, there was prepared resistance paste in the following manner: As the pretreatment, graphite powder (15 parts by weight) was mixed and milled together with 10 parts by weight of carbon black, 25 parts by weight of talc and 50 parts by weight of 50% phenolic resin solution dissolved in benzyl alochol.

The resistance paste was then applied by screen printing to a surface of an alumina substrate, baked at a temperature of 240° to 260° C. for 15 minutes, and subsequently maintained at a temperature of 150° C. for 3 hours to prepare a thick film type resistor.

The resistor was subjected to measurement of resistance at $-40°$ C., $+25°$ C. and $+105°$ C. respectively to determine the temperature coefficient of resistance (TCR) at high and low temperatures. The TCR was determined by the following equation:

$$TCR = \frac{R_T - R_{25}}{R_{25}} \times \frac{1}{\Delta T} \times 10^6$$

where $R_{25}$ is a resistance value measured at $+25°$ C., $R_T$ is a resistance value measured at $-40°$ C. or $+105°$ C., $\Delta T$ is a temperatue difference between $+25°$ C. and $-40°$ C. or $+105°$ C., respectively

Comparative Example 1

Using the same graphite powder, carbon black, talc and phenolic resin as those used in Example 1, there was prepared resistance paste by mixing and milling 15 parts by weight of graphite powder, 10 parts by weight of carbon black, and 25 parts by weight of talc with 50 parts by weight of 50% phenolic resin solutio dissolved in benzyl alcohol.

The thus prepared resistance paste was screen printed on alumina substrate and then baked in the same manner as Example 1 to prepare a thick film type resistor. The resistor was subjected to measurement of the temperature coefficient of resistance. Results are shown in Table 1.

Comparative Example 2

There was prepared resistance paste in the same manner as Example 1 except for that stearic acid is replaced witih acrylic acid. The thus prepared resistance paste was screen printed on alumina substrate and then baked in the same manner as Example 1 to prepare a thick film type resistor. The resistor was subjected to measurement of the temperature coefficient of resistance. Results are shown in Table 1.

Comparative Example 3

Using the same raw materials as Example 1, there was prepared resistance paste in the same manner as Example 1 except for that stearic acid was replaced with phenol.

The thus prepared resistance paste was screen printed on alumina substrate and then baked in the same manner as Example 1 to prepare a thick film type resistor. The resistor was subjected to measurement of the temperature coefficient of resistance. Results are shown in Table 1.

TABLE 1

| Specimen | Resistance at room temp. (KΩ) | TCR (ppm/°C.) | |
|---|---|---|---|
| | | At −40° C. | At +105° C. |
| Ex. 1 | 8.97 | −31 | +156 |
| Comp. Ex 1 | 7.97 | −342 | −134 |
| Comp. Ex 2 | 8.91 | −472 | −212 |
| Comp. Ex 3 | 10.0 | −477 | −196 |

From the results shown in Table 1, it will be seen that the temperature coefficient of resistance of the resistor of Example 1 is −31 ppm/° C. at −40° C. and +156 ppm/° C. at +105° C., which are shifted to the positve side, as compared with those of the resistors of the comparative Example 1. This means that the pretreatment of graphite with stearic acid shifts the temperature coefficient of resistance to the positive side. On the other hand, the pretreatment of graphite with acrylic acid or phenol shifts the temperature coefficient of resistance to the negative side, as will be understood from the results for Comparative Examples 2 and 3.

EXAMPLE 2

Using graphite powder having particle diameter ranging from 5 to 10 microns, carbon black, stearic acid, talc and phenolic resin, there was prepared resistance paste in the same manner as Example 1. Carbon black, stearic acid, talc and phenolic resin solution were the same as those in Example 1.

The resultant resistance paste was screen printed on an alumina substrate and then baked in the same manner as Example 1 to prepare a thick film type resistor. The temperature coefficient of resistance for this resistor was determined in the same manner as Example 1. Results are shown in Table 2.

Comparative Example 4

Using the same gaphite, talc and phenolic resin as those in Comparative Example 2, there was prepared resistance paste in the same manner as Example 1.

The resultant resistance paste was screen printed on an alumina substrate and then baked in the same manner as Example 1 to prepare a thick film type resistor. The temperature coefficient of resistance for this resistor was determined in the same manner as Example 1. Results are shown in Table 2.

TABLE 2

| Specimen | Resistance at room temp. (KΩ) | TCR (ppm/°C.) | |
|---|---|---|---|
| | | At −40° C. | At +105° C. |
| Ex. 2 | 10.6 | −233 | +138 |
| Comp. Ex 4 | 12.9 | −480 | −102 |

EXAMPLE 3

Using graphite powder having particle diameters ranging from 1 to 3 μm, carbon black having particle diameters of from 15 to 40 millimicrons, talc having a mean particle diameter of 2.1 μm, stearic acid and phenolic resin solution, there was prepared a thick film type resistor in the same manner as Example 1. The components, stearin and phenolic resin were the same as those used in Example 1, and the mixing ratios are the same as Example 1.

EXAMPLE 4

There was prepared a thick film type resistor in the same manner as Example 1, using the same materials as those used in Example 3 except for that talc was replaced with one having a mean particle size of 5.5 μm.

EXAMPLE 5

There was prepared a thick film type resistor in the same manner as Example 1, using the same materials as those used in Example 3 except for that talc was replaced with one having a mean particle size of 9.3 μm.

Comparative Example 5

Talc having a mean particle diameter of 9.3 μm was mixed and milled with 15 parts by weight of graphite powder, 10 parts by weight of carbon black, and 50 parts by weight of a 50% phenolic resin solution dissolved in benzyl alcohol in the same manner as Example 3 to prepare resistance paste. Using the resultant paste, there was prepared a thick film type rsistor in the same manner as Example 1.

The resistors prepared in Examples 3 to 5 and Comparative Example 5 were respectively subjected to measurements of humidity resistance and high temperature resistance, as well as the temperature coefficient of resistance. The temperature coefficient of resistance for this resistor was determined in the same manner as Example 1. The huidity resistance was determined from resistance values measured before and after leaving the resistor to stand under the conditions of 40° C. and relative humidity of 95% for 1000 hours. The high temperature resistance was determined from resistance values measured before and after leaving each resistor to stand in air at 70° C. for 1000 hours. Results are shown in Table 3 together with the resistance at room temperature, $R_{25}$.

TABLE 3

| Specimen | $R_{25}$ (KΩ) | TCR (ppm/°C.) | | Humidity resistance (%) | H. Temp. resistance (%) |
|---|---|---|---|---|---|
| | | −40° C. | +105° C. | | |
| Ex. 3 | 98 | −235 | +276 | +3.4 | −3.6 |
| Ex. 4 | 110 | −453 | +104 | +4.2 | −4.3 |
| Ex. 5 | 96 | −571 | +24 | +6.3 | −5.0 |
| Comp. Ex. 5 | 102 | −751 | +201 | +6.8 | −5.7 |

From the above results for specimens of Examples 3 to 5, it will be seen that the temperature coefficient of resistance shifts to the postive side with a decrease of the mean particle diameter of the filler. By comparing the data for Example 3 and Comparative Example 5, it will be seen that the resistance paste of the present invention makes it possible to produce film type resistors with improved humidity resistance and high temperature resistance.

I claim:

1. Resistance paste comprising 5 to 70 weight % conductive powder suspended in 20-80 weight % thermosetting binder resin, in which said conductive powder comprises graphite powder particles having a diameter of not more than 20μm and coated with at least one fatty acid having at least 12 carbon atoms.

2. The resistance paste according to claim 1 wherein said conductive powder comprises a mixture of graphite powder and up to 98% carbon black.

3. The resistance paste according to claim 1 further comprising a filler in an amount up to 30 weight percent, the particles of which have a mean particle diameter of not more than 5 μm.

4. The resistance paste according to claim 1 wherein said filler is talc.

5. Resistive paste according to claim 3 wherein said fatty acid is stearic acid.

6. Resistive paste according to claim 3, wherein said filler is an inorganic filler selected from the group consisting of silica and alumina.

7. Resistive paste according to claim 3, wherein said filler is an organic filler composed of fluorine resins.

8. The resistance paste according to claim 1 wherein said thermosetting binder resin is at least one resin selected from the group consisting of epoxy resin, milamine resin, phenol resin and xylene resin.

9. The resistance paste according to claim 1 wherein said conductive powder is graphite.

10. Resistive past according to claim 9 wherein said thermosetting resin is at least one resin selected from the group consisting of epoxy resins, melamine resins, phenol resins, xylene resins.

11. Resistance paste consisting essentially of 5 to 70 weight % conductive powder suspended in 20-80 weight % thermosetting binder resin, and 0.30 weight % of a filler whose particles have a mean particle diameter of no more than 5 μm in which said conductive powder comprises graphite powder particles having a diameter of not more than 20 μm and coated with at least one fatty acid having at least 12 carbon atoms.

12. The resistance paste according to claim 11 wherein said conductive powder is graphite.

13. The resistance paste according to claim 11 wherein said conductive powder compriss a mixture of graphite powder and up to 98% carbon black.

14. Resistive paste according to claim 11 wherein said thermosetting resin is at least one resin selected from the group consisting of epoxy resins, melamine resins, phenol resins, xylene resins.

* * * * *